US011546384B2

(12) United States Patent
Connelly et al.

(10) Patent No.: US 11,546,384 B2
(45) Date of Patent: *Jan. 3, 2023

(54) OBTAINING SERVICES THROUGH A LOCAL NETWORK

(71) Applicant: Comcast Cable Communications, LLC, Philadelphia, PA (US)

(72) Inventors: Michael Connelly, Philadelphia, PA (US); Sree Kotay, Philadelphia, PA (US); Hari Venkatram Pedaprolu, King of Prussia, PA (US); Bhagabati Prasad Maharana, Bensalem, PA (US)

(73) Assignee: Comcast Cable Communications, LLC., Philadelphia, PA (US)

( * ) Notice: Subject to any disclaimer, the term of this patent is extended or adjusted under 35 U.S.C. 154(b) by 237 days.

This patent is subject to a terminal disclaimer.

(21) Appl. No.: 16/032,226

(22) Filed: Jul. 11, 2018

(65) Prior Publication Data

US 2019/0141083 A1 May 9, 2019

Related U.S. Application Data

(63) Continuation of application No. 15/095,958, filed on Apr. 11, 2016, now Pat. No. 10,057,301, which is a (Continued)

(51) Int. Cl.
*H04L 29/06* (2006.01)
*H04L 65/1023* (2022.01)
(Continued)

(52) U.S. Cl.
CPC .......... *H04L 65/103* (2013.01); *H04L 65/104* (2013.01); *H04L 65/1026* (2013.01);
(Continued)

(58) Field of Classification Search
CPC . H04L 65/103; H04L 69/108; H04L 65/1026; H04L 65/104; H04L 65/1069;
(Continued)

(56) References Cited

U.S. PATENT DOCUMENTS 6,035,026 A * 3/2000 Kim ........................ H04M 3/56
379/202.01
6,081,534 A * 6/2000 Sipila ................... H04B 7/2659
370/466
(Continued)

FOREIGN PATENT DOCUMENTS

GB       2 419 774 A       5/2006
JP       2006333448 A       12/2006
(Continued)

OTHER PUBLICATIONS

European Search report EP 12161371.5, dated Jul. 26, 2012.
(Continued)

*Primary Examiner* — Parth Patel
(74) *Attorney, Agent, or Firm* — Banner & Witcoff, Ltd.

(57) ABSTRACT

One or more endpoints may be registered with a gateway at a premises. The gateway may include local physical interfaces for communicating with a first subset of the endpoints. The gateway may further include Session Initiation Protocol (SIP) proxy servers for communicating with a second subset of the endpoints. Incoming communications to the premises may be routed by the gateway to one or more of the endpoints via the local physical interfaces or the SIP proxy servers. One or more endpoints may initiate outgoing communications via the local physical interfaces or the SIP proxy servers.

24 Claims, 8 Drawing Sheets

Related U.S. Application Data continuation of application No. 13/097,466, filed on Apr. 29, 2011, now abandoned.

(51) Int. Cl.
*H04L 65/1033* (2022.01)
*H04L 65/1069* (2022.01)
*H04L 69/08* (2022.01)
*H04L 65/1045* (2022.01)
*H04M 7/00* (2006.01)

(52) U.S. Cl.
CPC ...... *H04L 65/1036* (2013.01); *H04L 65/1045* (2022.05); *H04L 65/1069* (2013.01); *H04L 69/08* (2013.01); *H04M 7/0069* (2013.01)

(58) Field of Classification Search
CPC . H04L 65/1036; H04L 65/105; H04M 7/0069
See application file for complete search history.

(56) References Cited

U.S. PATENT DOCUMENTS

| | | | | |
|---|---|---|---|---|
| 6,216,016 B1* | 4/2001 | Cronin | ............... | H04W 88/02 455/567 |
| 6,396,840 B1 | 5/2002 | Rose et al. | | |
| 6,963,583 B1* | 11/2005 | Foti | ............... | H04Q 3/0025 370/352 |
| 6,977,933 B2 | 12/2005 | Soncodi | ............... | H04L 45/245 370/352 |
| 7,010,300 B1 | 3/2006 | Jones et al. | | |
| 7,133,506 B1* | 11/2006 | Smith | ............... | H04M 3/53366 379/88.25 |
| 7,197,127 B2* | 3/2007 | Stevens | ............... | H04M 3/436 379/207.13 |
| 7,298,747 B2 | 11/2007 | Mercuriali | | |
| 7,640,319 B1 | 12/2009 | Sylvain et al. | | |
| 7,734,908 B1 | 6/2010 | Kung et al. | | |
| 7,822,190 B2* | 10/2010 | Da Palma | ............... | H04L 29/06027 370/352 |
| 7,830,860 B2* | 11/2010 | Farris | ............... | H04L 45/22 370/352 |
| 8,098,671 B1* | 1/2012 | DeRuijter | ............... | H04L 65/105 370/401 |
| 8,150,015 B1 | 4/2012 | Whitney et al. | | |
| 8,150,450 B1 | 4/2012 | Wengrovilz | | |
| 8,478,277 B2* | 7/2013 | Jiang | ............... | H04M 3/548 455/445 |
| 8,576,270 B1* | 11/2013 | Vitale | ............... | H04M 3/53308 348/14.01 |
| 8,688,107 B2 | 4/2014 | Conner et al. | | |
| 8,825,907 B2* | 9/2014 | Nerst | ............... | H04L 29/08846 379/220.01 |
| 8,861,508 B2* | 10/2014 | Noldus | ............... | H04L 29/12188 370/352 |
| 8,862,751 B2* | 10/2014 | Faccin | ............... | H04L 63/104 709/219 |
| 8,873,728 B2* | 10/2014 | Brunson | ............... | H04M 3/56 379/202.01 |
| 9,043,475 B2 | 5/2015 | Bian | ............... | H04L 65/1063 709/227 |
| 9,160,861 B2* | 10/2015 | Abramson | ............... | H04M 3/4234 |
| 9,317,855 B2* | 4/2016 | Altberg | ............... | G06Q 30/02 |
| 9,331,888 B1 | 5/2016 | Conway | ............... | H04L 65/1026 |
| 9,473,991 B2* | 10/2016 | Noldus | ............... | H04L 29/06027 |
| 9,614,977 B1* | 4/2017 | Bond | ............... | H04M 11/066 |
| 10,200,265 B2* | 2/2019 | Lee | ............... | H04L 43/0876 |
| 2002/0051519 A1* | 5/2002 | Moyano | ............... | H04M 3/42229 379/67.1 |
| 2003/0014659 A1 | 1/2003 | Zhu | | |
| 2003/0229900 A1 | 12/2003 | Reisman | | |
| 2004/0072593 A1* | 4/2004 | Robbins | ............... | H04M 3/42314 455/560 |
| 2004/0088421 A1 | 5/2004 | Huang | | |
| 2004/0199580 A1 | 10/2004 | Zhakov et al. | | |
| 2004/0242230 A1 | 12/2004 | Rue | | |
| 2004/0246822 A1 | 12/2004 | Wong | | |
| 2004/0264410 A1* | 12/2004 | Sagi | ............... | H04W 36/0005 370/331 |
| 2005/0068938 A1* | 3/2005 | Wang | ............... | H04M 7/123 370/352 |
| 2005/0070288 A1* | 3/2005 | Belkin | ............... | H04W 36/0066 455/439 |
| 2005/0129193 A1* | 6/2005 | Watts | ............... | H04L 29/06027 379/88.17 |
| 2005/0141479 A1* | 6/2005 | Ozugur | ............... | H04L 51/04 370/351 |
| 2005/0237978 A1* | 10/2005 | Segal | ............... | H04W 88/06 370/331 |
| 2005/0277431 A1* | 12/2005 | White | ............... | H04W 8/04 455/466 |
| 2005/0281393 A1 | 12/2005 | Kubo et al. | | |
| 2006/0067302 A1* | 3/2006 | Wengrovitz | ............... | H04M 1/2535 370/352 |
| 2006/0116127 A1* | 6/2006 | Wilhoite | ............... | H04M 3/42246 455/442 |
| 2006/0126806 A1 | 6/2006 | Trandal et al. | | |
| 2006/0142012 A1 | 6/2006 | Kirchhoff et al. | | |
| 2006/0230130 A1 | 10/2006 | Cho et al. | | |
| 2006/0285674 A1* | 12/2006 | Le Creff | ............... | H04L 29/06027 379/211.01 |
| 2007/0047707 A1* | 3/2007 | Mayer | ............... | H04M 15/00 379/114.28 |
| 2007/0060196 A1* | 3/2007 | Sharma | ............... | H04W 8/08 455/552.1 |
| 2007/0070948 A1* | 3/2007 | Kezys | ............... | H04L 12/6418 370/331 |
| 2007/0104184 A1* | 5/2007 | Ku | ............... | H04L 29/1216 370/352 |
| 2007/0121908 A1* | 5/2007 | Benedyk | ............... | H04L 29/12122 379/350 |
| 2007/0140169 A1* | 6/2007 | Rajagopalan | ............... | H04W 28/18 370/331 |
| 2007/0153776 A1* | 7/2007 | Joseph | ............... | H04L 29/06027 370/356 |
| 2007/0153807 A1 | 7/2007 | Cruz et al. | | |
| 2007/0171898 A1* | 7/2007 | Salva | ............... | H04L 29/06027 370/356 |
| 2007/0189269 A1* | 8/2007 | Ho | ............... | H04L 29/06027 370/352 |
| 2007/0189279 A1* | 8/2007 | Thalanany | ............... | H04L 12/66 370/356 |
| 2007/0217594 A1* | 9/2007 | Giacometto | ............... | H04L 41/12 379/219 |
| 2007/0238472 A1 | 10/2007 | Wanless | | |
| 2007/0265003 A1 | 11/2007 | Kezys et al. | | |
| 2007/0276947 A1* | 11/2007 | Panattu | ............... | H04L 65/4061 709/227 |
| 2007/0288632 A1 | 12/2007 | Kanaparti et al. | | |
| 2008/0037513 A1 | 2/2008 | Gerding et al. | | |
| 2008/0039132 A1* | 2/2008 | Delibie | ............... | H04W 88/06 455/552.1 |
| 2008/0046542 A1* | 2/2008 | Sano | ............... | H04W 36/14 709/218 |
| 2008/0056235 A1 | 3/2008 | Albina et al. | | |
| 2008/0069073 A1* | 3/2008 | Sano | ............... | H04W 4/16 370/342 |
| 2008/0095333 A1 | 4/2008 | Tudor | | |
| 2008/0123629 A1* | 5/2008 | Ou Yang | ............... | H04M 1/247 370/352 |
| 2008/0133580 A1 | 6/2008 | Wanless et al. | | |
| 2008/0239968 A1 | 10/2008 | Olsen et al. | | |
| 2008/0240016 A1 | 10/2008 | Cai et al. | | |
| 2008/0247384 A1* | 10/2008 | Arauz-Rosado | ............... | H04L 29/1216 370/352 |
| 2009/0003316 A1* | 1/2009 | Lee | ............... | H04L 12/5692 370/352 |
| 2009/0010250 A1 | 1/2009 | Ganesan et al. | | |
| 2009/0013078 A1* | 1/2009 | Bencheikh | ............... | H04L 65/80 709/227 |
| 2009/0063626 A1 | 3/2009 | Nakagawa et al. | | |

(56) References Cited

U.S. PATENT DOCUMENTS

| | | | |
|---|---|---|---|
| 2009/0073960 A1* | 3/2009 | Kalaboukis | H04M 7/1245 370/352 |
| 2009/0132712 A1* | 5/2009 | P | H04L 65/105 709/227 |
| 2009/0172138 A1 | 7/2009 | Wang et al. | |
| 2009/0213751 A1* | 8/2009 | Langefeld | H04W 48/18 370/254 |
| 2009/0219920 A1 | 9/2009 | Brandstatter | |
| 2009/0245265 A1 | 10/2009 | Takeshima et al. | |
| 2009/0300357 A1* | 12/2009 | Kumar | H04L 41/042 713/171 |
| 2009/0310595 A1* | 12/2009 | Badger | H04M 7/127 370/352 |
| 2010/0061365 A1* | 3/2010 | Farah | H04M 7/125 370/352 |
| 2010/0062766 A1* | 3/2010 | Cook | H04L 41/5054 455/435.1 |
| 2010/0153726 A1* | 6/2010 | Liu | H04L 9/083 713/171 |
| 2010/0157986 A1* | 6/2010 | Rao | H04L 29/1216 370/352 |
| 2010/0158229 A1* | 6/2010 | Ku | H04L 29/1216 379/201.01 |
| 2010/0173627 A1* | 7/2010 | Gustafson | H04W 76/12 455/426.1 |
| 2011/0044210 A1* | 2/2011 | Yokota | H04W 76/10 370/259 |
| 2011/0077012 A1* | 3/2011 | Lee | H04M 1/006 455/445 |
| 2011/0116619 A1* | 5/2011 | Bjorkner | H04M 7/0057 379/315 |
| 2011/0135077 A1* | 6/2011 | Wengrovitz | H04M 3/56 379/202.01 |
| 2011/0149750 A1* | 6/2011 | Sharma | H04W 36/14 370/252 |
| 2011/0320531 A1* | 12/2011 | Cheah | G06Q 10/06 709/203 |
| 2012/0179775 A1* | 7/2012 | Ma | H04W 48/18 709/217 |
| 2012/0275450 A1* | 11/2012 | Connelly | H04L 65/104 370/352 |
| 2012/0324120 A1* | 12/2012 | Lee | H04L 12/2838 709/228 |
| 2013/0229950 A1* | 9/2013 | Bjorsell | H04L 63/00 370/259 |
| 2013/0268612 A1* | 10/2013 | Witzel | H04W 8/06 709/206 |
| 2013/0275528 A1* | 10/2013 | Miner | H04L 51/18 709/206 |
| 2013/0343201 A1* | 12/2013 | Desroches | H04N 21/6125 370/242 |
| 2017/0134324 A1* | 5/2017 | Miner | H04L 51/14 |

FOREIGN PATENT DOCUMENTS

| | | |
|---|---|---|
| WO | 02/28047 A2 | 4/2002 |
| WO | 2010034322 A1 | 4/2010 |

OTHER PUBLICATIONS

3GPP TS 23.218 V9.1.0 (Mar. 2010), 3rd Generation Partnership Project; Technical Specification Group Core Network and Terminals; IP Multimedia (IM) session handling; IM call model; Stage 2 (Release 9).

3GPP TS 24.229 V9.3.1 (Mar. 2010), 3rd Generation Partnership Project; Technical Specification Group Core Network and Terminals; IP multimedia call control protocol based on Session Initiation Protocol (SIP) and Session Description Protocol (SDP); Stage 3 (Release 9).

PacketCable™ 1.5 Specifications Network-Based Call Signaling Protocol PKT-SP-NCS1.5-I03-070412, Apr. 12, 2007.

PacketCable™ IMS Delta Specifications Session Initiation Protocol (SIP) and Session Description Protocol (SDP); Stage 3 Specification 3GPP TS 24.229 PKT-SP-24.229-I06-100120, Jan. 20, 2010.

IEEE 802.11b/g Wireless VoIP Phone Model: V630 Support Note Version: 1.0 Date of issue: Sep. 19, 2008.

Sangheon Pack, Member, IEEE, and Hojin Lee, Student Member, IEEE, "Call Setup Latency Analysis in SIP-Based Voice over WLANs", Feb. 2008, IEEE Communications Letters, vol. 12, No. 2.

Network-Based Call Signaling Protocol, PKT-SP-NCS1.5-I03-070412, Apr. 12, 2007, PacketCable™ 1.5 Specifications.

IEEE 802.11b/g wireless VOIP phone published in Sep. 19, 2008.

European Office Action—EP Appl. 12161371.5—dated Feb. 16, 2016.

Jan. 3, 2018—Canadian Office Action—CA 2,772,511.

May 30, 2018—European Office Action—EP 12161371.5.

\* cited by examiner

OBTAINING SERVICES THROUGH A LOCAL NETWORK

CROSS-REFERENCE TO RELATED APPLICATIONS

This application is a continuation of U.S. application Ser. No. 15/095,958, filed Apr. 11, 2016, which is a continuation of U.S. application Ser. No. 13/097,466, filed Apr. 29, 2011, the entire disclosure of which is herein incorporated by reference.

BACKGROUND

Many types of wireless and wired mobile devices allow a user to connect that device to a local network. Once joined to a local network, the device can then communicate with a wide area network such as the global Internet or other wider area data network through the local network. In some cases this allows the device to communicate using a more reliable network and/or using a network having a higher data throughput. In many cases, however, it may be difficult for the device to fully utilize other services in the local network.

SUMMARY

This summary is provided to introduce a selection of concepts in a simplified form that are further described below in the Detailed Description. This summary is not intended to identify key features or essential features of the disclosure.

In at least some embodiments, a local network gateway exchanges signaling data for a voice communication session with an external network. The gateway also processes internal signaling information relating to that voice communication session and exchanges same across logical ports within the local network gateway. Each of the logical ports is associated with a separate communication session end point in the local network. In response to the internal signaling information exchanged across a logical port, signaling data is exchanged with a communication session end point using a signaling protocol and physical interface corresponding to the end point. A voice communication session can be established between the local network gateway and an external network and bridged to local communication sessions between the local network gateway and local end points.

DETAILED DESCRIPTION

Figure 1:
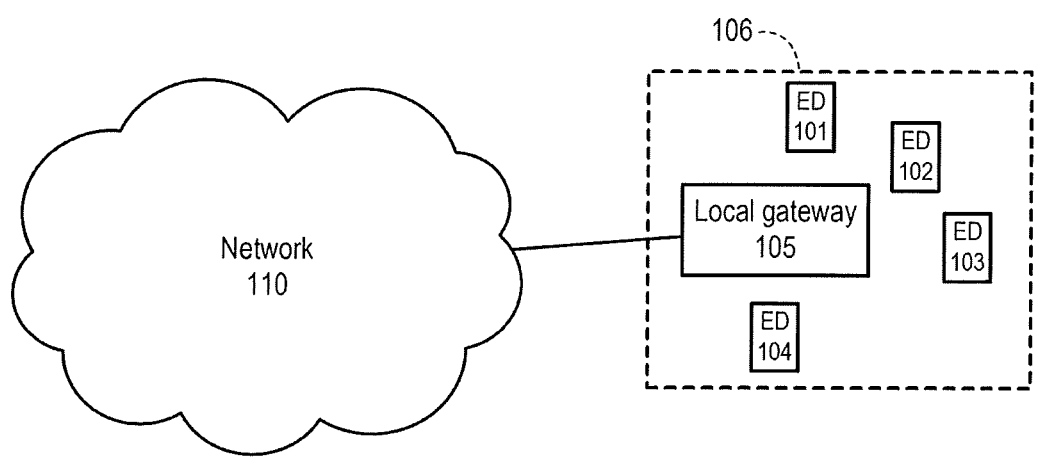
FIG. 1 is a block diagram showing a network architecture in which at least some embodiments may be implemented.

FIG. 1 is a block diagram showing a network architecture in which at least some embodiments may be implemented.

A plurality of local end devices 101-104 and a local gateway 105 form a local network at a premises 106. In the example of FIG. 1, devices 101 and 102 may be, for example, DECT (Digital Enhanced Cordless Telecommunications) handsets that communicate with gateway 105 over a DECT wireless interface. Device 103 may be a terminal communicating with gateway 105 over a general-purpose local wireless data interface. Device 104 may be a POTS (plain old telephone service) telephone that communicates with gateway 105 over a wired analog telephony interface that includes an RJ11 jack. Alternatively, end devices 101-104 may be any other user devices.

Gateway 105 communicates with various non-local elements in wide area network 110, with wide area network 110 being external to premises 106. As used herein, "non-local" merely refers to an element not being part of the local network of gateway 105. Non-local elements can include, e.g., call management servers, data servers, video servers, and other network elements used to create and maintain data access and communication services, such as telephone calls and other types of voice communication sessions. External network 110, which may be of regional or national scope, may include a number of sub-networks and/or links to additional networks. For example, network 110 may include an access sub-network that connects gateway 105 (and other gateways at other premises, not shown) to network 110. That access sub-network could be any of various types. Examples of access sub-network types in various embodiments include, but are not limited to, a passive optical network (PON) access sub-network, a digital subscriber line (DSL) access sub-network, a wide area wireless access sub-network and a hybrid fiber coaxial (HFC) access sub-network. An access sub-network connecting gateway 105 to network 110 may utilize known media access control (MAC), transport and other communication protocols conventionally used with a particular type of access sub-network architecture and communication technology. As but one non-exclusive example, communications in an HFC access sub-network may utilize protocols as described in one or more Data over Cable Service Interface Specifications (DOCSIS) standards. Network 110 may include numerous access sub-networks of different types.

Gateway 105 may communicate with different elements in network 110 so as to obtain different types of services. For example, the operator of network 110 may provide a general-purpose data service to premises 106 that allows gateway 105 to access the public Internet and/or other public or local data networks. As another example, the operator of network 110 may provide various types of multicast and/or unicast content (e.g., movies, television programming, etc.) to premises 106 through gateway 105. As a further example, and as discussed in further detail below, the operator of network 110 may provide telephony or other type of voice communication services to premises 106 through gateway 105.

Figure 2:
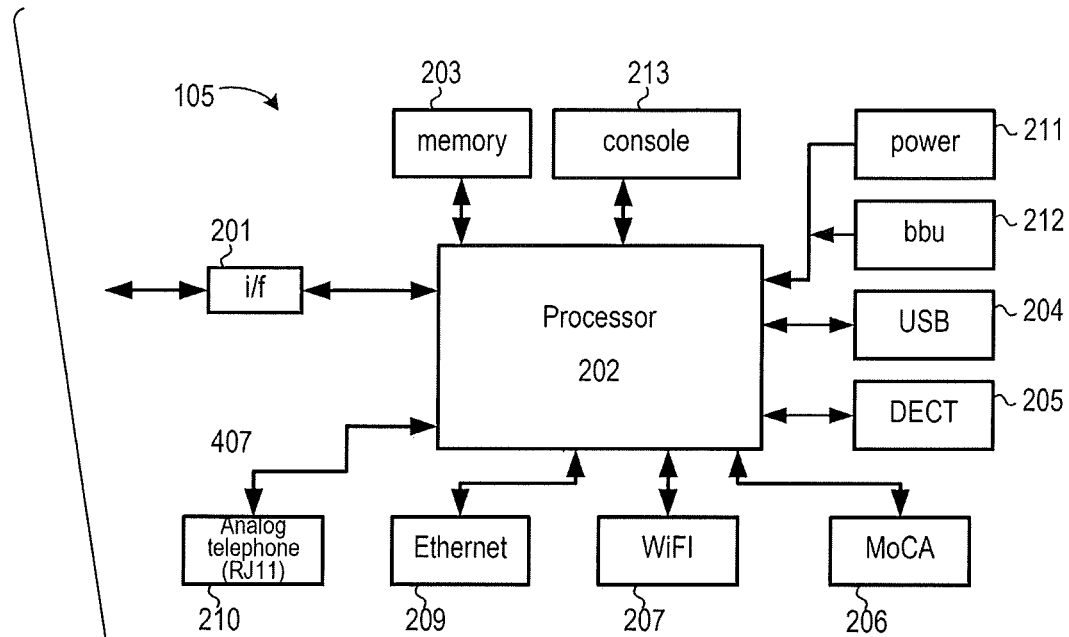
FIG. 2 is a block diagram showing a local network gateway and an end device according to some embodiments.
Figure 2:
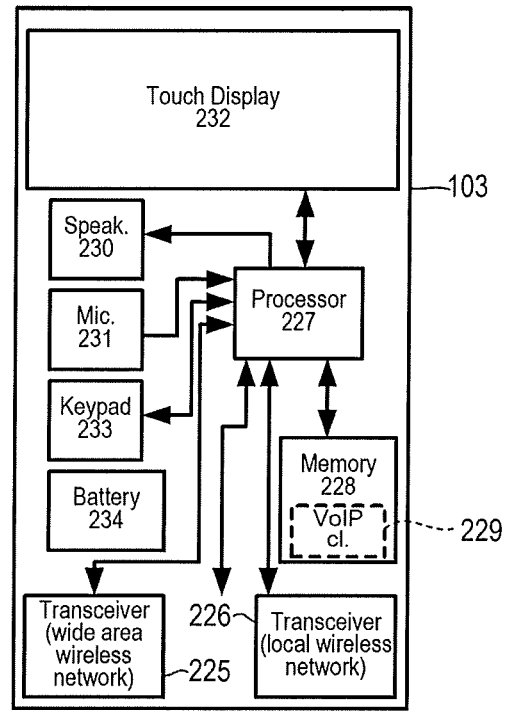

FIG. 2 is a block diagram showing additional details of an example implementation of gateway 105 and of end device 103. Gateway 105 may communicate with network 110 over physical interface (i/f) 201 that provides a physical connection to the medium of an access sub-network, if present, that connects gateway 105 to network 110. In an HFC access sub-network, interface 201 could include hardware for tuning to RF frequency channels, for demodulating signals received in those tuned channels, for outputting data from demodulated signals for further processing, for modulating data onto an upstream signal and for transmitting that upstream signal to network 110. In a PON access sub-network, interface 201 could include the components of an optical network terminal (ONT) that performs modulation, demodulation, transmission and receiving operations. In a wide area wireless access sub-network, interface 201 may include a wireless transceiver that performs tuning, modulation, demodulation, transmission and receiving operations. In a DSL access sub-network, interface 201 may include a DSL modem that performs the modulation, demodulation, transmission and receiving operations. In still further embodiments, interface 201 may include an Ethernet or other local network interface that connects gateway 201 to a separate cable modem, ONT, wireless transceiver, DSL modem or other access sub-network connection point.

Gateway 105 includes a main processor 202 and a memory 203. Processor 202 communicates with network 110 over interface 201. Processor 202 is further configured to execute instructions so as to perform various operations as described herein (e.g., operations of a gateway session manager module discussed below), to perform various operations in connection with MAC, transport and other protocols used for communication with network 110, and to control operation of other components of gateway 105. Instructions executed by processor 202 may be hard-wired logic gates and/or may be instructions read from memory 203 or another service. Memory 203 may include volatile and non-volatile memory and can include any of various types of storage technology, including but not limited to read only memory (ROM) modules, random access memory (RAM) modules, magnetic tape, magnetic discs (e.g., a fixed hard disk drive or a removable floppy disk), optical disk (e.g., a CD-ROM disc, a CD-RW disc, a DVD disc), flash memory, and EEPROM memory. Processor 202 may be implemented with any of numerous types of devices, including but not limited to general purpose microprocessors, application specific integrated circuits, field programmable gate arrays, and combinations thereof. Although a single block is shown for memory 203 and a single block shown for processor 202, memory and computational operations of gateway 105 could respectively be distributed across multiple memory devices and multiple processors located within gateway 105. Alternatively, memory and computational operations of gateway 105 could be contained within a single application specific integrated circuit (ASIC) or other component.

Processor 202 communicates with end devices 101-104 and/or with other end devices at premises 106 through various local communication physical interfaces. Such interfaces can include a USB interface 204, a DECT 6.0 interface 205, a MOCA (Multimedia Over Coax) interface 206, a WiFi interface 207, an Ethernet interface 209 and an analog telephony interface 210. In some embodiments, each of interfaces 204-210 may be a separate ASIC or collection of ASICs having processing and memory components and configured to carry out the operations associated with the interface. Such operations could include modulation and demodulation of signals used to carry data over the interface, operations associated with a MAC protocol used on the interface, etc. In other embodiments, one, some or all of interfaces 204-210, processor 202 and/or memory 203 may be incorporated into the same ASIC. In still other embodiments a portion of the hardware and/or instructions associated with an interface may be incorporated into an ASIC with processor 202 and a portion may reside in a separate ASIC.

In other embodiments, a gateway may also include other types of local physical interfaces for communicating with other types of end devices. Examples of such interfaces include but are not limited to a CAT-iq (Cordless Advanced Technology—Internet and Quality) interface for communication with CAT-iq end devices, a DLNA (Digital Living Network Alliance) interface for communicating with other devices in a premises, a femtocell interface for communicating with mobile telephones and other mobile devices, etc. A power supply 211 and/or battery backup 212 provide electrical power. User input to gateway 105 may be provided over one of the aforementioned interfaces or via a separate collection of buttons or other controls in a console 213.

End device 103 may comprise, for example, a smart phone that includes a transceiver 225 used for direct communication over a wide area wireless network (e.g., a 3G mobile networking and telecommunication network, an EDGE (Enhanced Data rate for GSM Evolution) network, an EVDO (EVolution Data Optimized) network) or another type of network. Transceiver 225 demodulates signals received over a wide area wireless network, modulates data, and transmits modulated data signals in the wide area wireless network. A second transceiver 226 is configured to allow device 103 to communicate within a general-purpose local wireless network. Transceiver 226 demodulates signals received in a local wireless network, modulates data and transmits modulated data signals in that local wireless network. Transceivers 225 and 226 also exchange data with processor 227, which is configured to execute instructions so as to perform various operations as described herein and to control operation of other components of device 103. Those instructions may be stored in memory 228 as executable instructions and/or as hard wired logic within processor 227. For example, stored in memory 228 is a SIP-based voice communication client 229. Client 229, which is discussed below, could be, e.g., a VoIP (Voice over Internet Protocol) client. Processor 227 may also be configured to perform one or more types of CODEC operations to convert data to audio for output through speaker 230 and to convert sound received through microphone 231 into data. Processor 227 outputs video data to a display 232 and receives user input through a keypad 233 and/or through touch sensitive portions of display 232. Processor 227 is configured to provide a browser or other graphical user interface (GUI) on display 232 by which a user of device 102 can receive information and provide input. A battery 234 provides electrical power to device 103.

End device 103 is able to communicate with gateway 105 over a general-purpose, local wireless data interface using transceiver 226. Examples of general-purpose wireless data interfaces include interfaces such as are described by Institute of Electrical and Electronics Engineers standard 802.11 (IEEE 802.11). In the embodiment of FIG. 2, WiFi interface 207 of gateway 105 and transceiver 226 of device 103 are configured for communication over IEEE 802.11 interfaces. In other embodiments, terminal 103 could take the form of a laptop computer, a tablet computer, or other device having WiFi (or other general-purpose wireless interface) capability. The foregoing description for a device is exemplary only, and other implementations for both wired and wireless user devices 103 are possible as desired.

Figure 3:
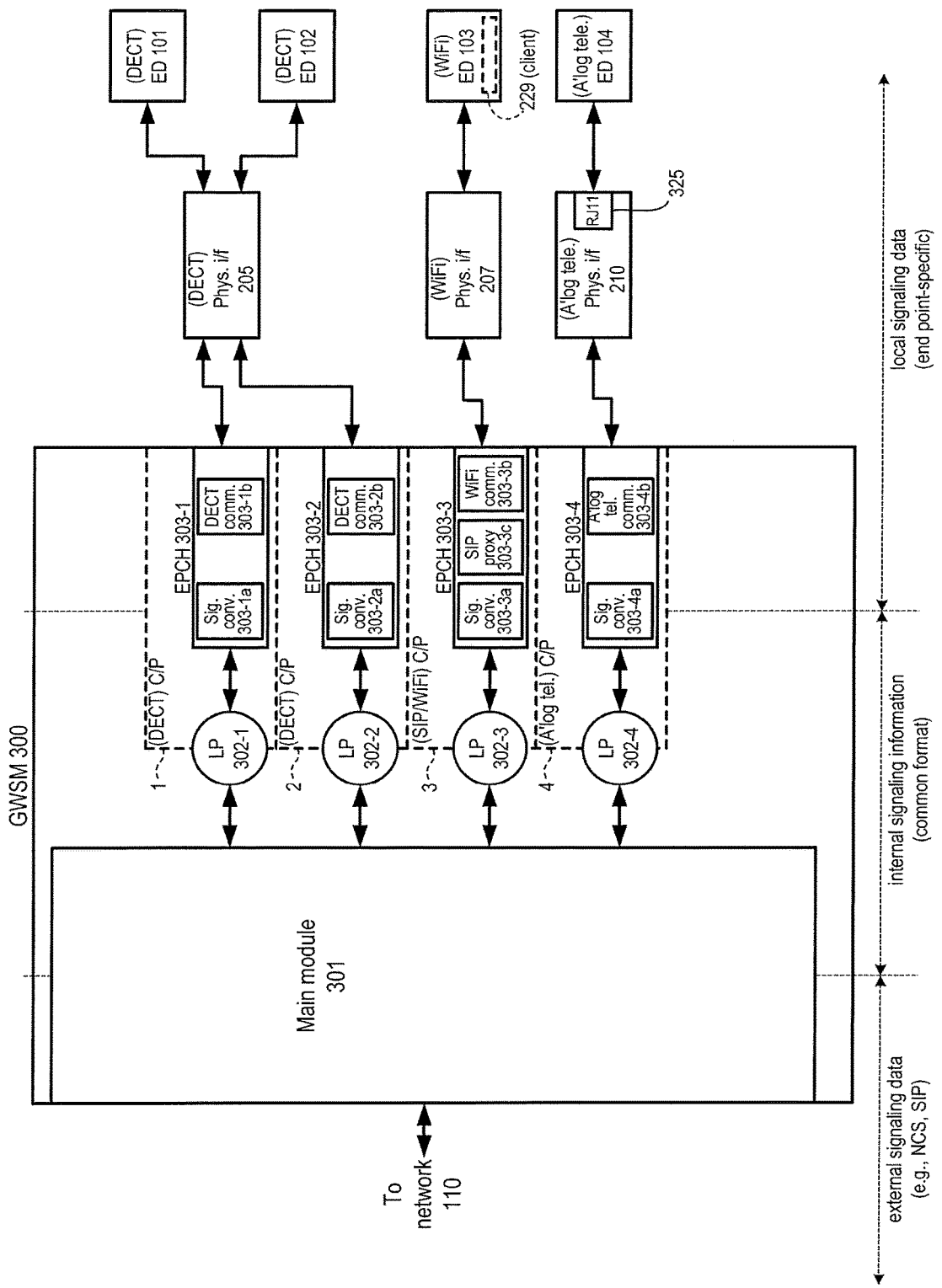
FIG. 3 is a block diagram showing various modules executing or executable within a local network gateway according to at least some embodiments.

FIG. 3 is a block diagram showing examples of various operational modules executing or executable within gateway 105. For example, each of various blocks of gateway session manager (GWSM) module 300 in FIG. 3 represents groups of operations performed within gateway 105 in response to execution of stored instructions. Each of the blocks in FIG. 3 need not correspond to a separate physical component. For example, operations from multiple modules might be performed within a single processor or ASIC (e.g., processor 202 in embodiments where processor 202 is a single processor or ASIC). In other embodiments, operations of various modules may be distributed across multiple processors or ASICs (e.g., operations of some modules of GWSM module 300 could be performed by processors or ASICs of one or more of physical interfaces 204-207 and 209). Moreover, the arrangement of blocks in FIG. 3 is only intended to show functional relationships between various modules in some embodiments. Computational and other data processing circuits, signal processing and communication circuits, and/or memory associated with operations in the FIG. 3 modules need not have the same relative locations represented by blocks in FIG. 3.

GWSM module 300 includes a main module 301 and a plurality of communication port (C/P) modules 1-4. C/P modules 1-4 are described below. Main module 301 establishes, manages and discontinues external voice communication sessions between gateway 105 and non-local devices that are external to the local area network of gateway 105. Such external voice communication sessions can include voice communication sessions between gateway 105 and non-local devices in network 110, between gateway 105 and non-local devices in the public switched telephone network (PSTN), and/or between gateway 105 and non-local devices in other networks accessible through network 110. Voice communication sessions can include, but are not limited to, VoIP telephone calls. Voice communication sessions could also involve exchange of additional data (e.g., real time video data, text, etc.). In connection with establishing, maintaining and discontinuing external voice communication sessions, main module 301 generates and sends external signaling data to various elements in external network 110. Similarly, main module 301 receives external signaling data from other network 110 elements and processes such signaling data. Examples of various types of external signaling data are included below. Main module 301 also receives media data (e.g., data encoding voice audio) from and sends media data to non-local elements in network 110.

In some embodiments, main module 301 may perform many functions of a conventional embedded media terminal adapter (EMTA). For example, main module 301 may exchange NCS (Network-based Call Signaling) external signaling messages with a call management server (CMS) and/or other NCS-based network elements in network 110. NCS messages exchanged between an EMTA and NCS-based network elements are known in the art and described, e.g., by a document titled "PacketCable™ 1.5 Specifications Network-Based Call Signaling Protocol PKT-SP-NCS1.5-I03-070412" (available from Cable Television Laboratories, Inc.). In other embodiments, main module 301 may perform many functions of a conventional embedded digital voice adapter (EDVA). In some such embodiments, main module 301 may exchange SIP (Session Initiation Protocol) external signaling messages with a call state control function (CSCF) and/or other IP Multimedia System (IMS) elements in network 110. SIP messages exchanged between an EDVA and IMS network elements are known in the art and described, e.g., by a document titled "PacketCable™ IMS Delta Specifications Session Initiation Protocol (SIP) and Session Description Protocol (SDP); Stage 3 Specification 3GPP TS 24.229 PKT-SP-24.229-I06-100120" (also available from Cable Television Laboratories, Inc.).

In addition to external voice communication sessions between gateway 105 and non-local devices outside the local network of gateway 105, local voice communication sessions can be established between gateway 105 and local end devices. As part of local voice communication sessions, media data is exchanged between gateway 105 and local end devices. Similarly, local signaling data is exchanged between gateway 105 and local end devices in connection with the creation, management and discontinuance of such local voice communication sessions. Local signaling data may use a protocol that is specific to a particular type of local end device and/or software client on a local end device, and may be different from a protocol used for external signaling data.

Main module 301 can act as a link (or "bridge") between an external voice communication session and a local voice communication session. In this manner, the local end device participating in the local session with gateway 105 is able to exchange media data with a non-local device participating in an external session with gateway 105. Main module 301 can also act as a bridge between separate local voice communication sessions. In this manner, main module 301 can facilitate communications between local end devices and/or between multiple local end devices and a non-local device.

Each local voice communication session between a local end device (and/or client executing on an end device) may be established between that local end device (and/or client) and a C/P module that is specific to that local end device (and/or client). As explained below, main module 301 associates the logical port of each C/P module with a specific local end point within the local network of gateway 105. A local end point may be a local end device (e.g., DECT handset end devices 101 and 102, POTS telephone 104) and/or may include a communication software client executing on a local end device (e.g., client 229 executing on device 103). Main module 301 communicates with a local end point though the C/P module associated with that local end point. In particular, main module 301 sends media data intended for a particular local end point to the C/P module associated with that local end point and receives media data from that local end point through the associated C/P module.

As part of its operations, main module 301 may maintain a list of telephone numbers (TNs) assigned to premises 106 by, for example, an operator of network 110, a list of which TNs are currently in use (e.g., by one of the local end points in premises 106), etc. Main module 301 may also maintain user profile data regarding which TNs might be associated with which local end points, whether incoming calls to a particular TN should cause all on-hook local end points to be signaled of the incoming calls, etc. Such user profile data can be based on preferences provided by individual users at the time of system setup or at other times, and/or can be maintained at a server in network 110 and periodically updated to main module 301.

Main module 301 may also perform media conversion. For example, a first local end point associated with a first C/P module may encode and decode audio data using a particular CODEC (e.g., according to ITU-T standard G.711). A second local end point associated with a second C/P module may encode and decode audio data using a different CODEC (e.g., according to ITU-T standard G.722). Main module 301 might receive G.711 media data from the first local end point through the first C/P module, transcode that media data so as to conform to G.722, and forward the transcoded media data through the second C/P module. As another example, media data that main module 301 exchanges with network 110 may be formatted in accordance with first media protocol, but a local end point in premises 106 may utilize a second media protocol. Main module 301, which may also store data regarding media protocols supported by individual end points and/or by network 110, might thus perform transcoding between the first and second media protocols when forwarding media data between network 110 and that local end point.

As indicated above, local communication sessions between local end devices and gateway 105 are created, maintained and discontinued using a separate C/P module that is associated with each local end point. In some embodiments, C/P modules can be software and/or firmware modules that can be individually added to (e.g., installed on) the software and/or firmware that performs the operations of GWSM module 300.

Each C/P module includes a logical port (LP) and an end point call handler (EPCH) module, each of which is also associated with the local end point that is associated with the C/P module. Main module 301 thus associates each logical port with a specific end point and uses that logical port to exchange data with the associated end point. Each logical port could be implemented as, e.g., a programming hook, a memory address, a multiplexing time slot, a dedicated physical port, or other mechanism for linking data with a particular destination and source. When sending media data to or receiving media data from a particular end point, main module 300 sends that media data to or receives that media data from the logical port associated with that end point. Similarly, main module 300 sends and receives signaling information relating to a particular end point by sending and receiving that signaling through that end point's associated logical port.

The EPCH of a particular C/P module may contain a variety of additional modules. The types of modules contained by an EPCH will vary based on the end point associated with the EPCH. In many cases, an EPCH may include a signaling conversion module and a communication module. The operations performed by a communication module can include registration and deregistration of an associated end point, as well as creating, managing and discontinuing local communication sessions with the associated end point. As part of creating, managing and discontinuing such local communication sessions, the communication module sends and receives media and signaling data to the end point using the signaling protocol specific to the end point. A communication module sends data to and receives data from an end point through the physical interface used by that end point. In some cases, multiple C/P modules (and thus multiple communication modules) may share a single physical interface. The operations performed by a physical interface may vary based on physical interface type. In general, a physical interface may create, transmit and receive the RF, electrical or other type of signal used to communicate data to and from an end device. Each physical interface may also modulate and/or demodulate such signals, perform MAC functions, and carry out other operations specific to a physical interface.

As indicated above, signaling data is exchanged as part of creating, maintaining and discontinuing both external and local communication sessions. For example, in response to external signaling data received from network 110, GWSM main module 301 may create an external communication session with a non-local device and also cause one or more of C/P modules 1-4 to create a local communication session with a local end point. Main module 300 may then bridge those two communication sessions. Similarly, a C/P module may establish a local communication session with its associated end point and cause main module 300 to create an external communication session, with main module 300 then bridging those two sessions.

In at least some embodiments, the protocol used for external signaling data (e.g., NCS signaling, IMS (SIP) signaling) is different from the signaling protocol used by one or more local end points (e.g., DECT signaling). However, main module 301 can employ a common internal signaling information format to create an abstraction layer for exchange of signaling information between external and local communication sessions that employ dissimilar signaling protocols. In response to external signaling data (e.g., a request to set up voice telephony session), main module 300 generates internal signaling information using the common internal signaling format and forwards that information to a logical port associated with one or more appropriate end points. Signaling conversion modules then receive that common-format internal signaling information and generate appropriate signaling data using the signaling protocols of the associated end points. The signaling conversion modules similarly receive signaling data from the associated end points using the end points' signaling protocols, generate common-format internal signaling information, and forward that internal signaling information to main module 301 across the logical ports.

Returning to FIG. 3, C/P module 1 includes a logical port 302-1 and an EPCH 303-1. EPCH 303-1 includes a signaling conversion module 303-1a and a communication module 303-1b. Communication module 303-1b communicates with DECT physical interface 205 and performs various operations in connection with DECT end device 101. Communication port 101 can be created when a new DECT end device 101 is powered on or otherwise enters the transmission/receiving range of DECT interface 205, or may be created during setup of gateway 105. When C/P module 1 is initially created, main module 301 becomes aware of end device 101 as a new end point and of the logical port 302-1 across which main module 301 may communicate with the new end point. Stated differently, main module 301 associates the new end point with the associated logical port across which communications relating to that end point will pass.

Communication module 303-1b establishes, maintains and discontinues communication sessions with DECT end device 101. For example, communication module 303-1b may initially establish a local communication session with end device 101 by exchanging signaling data related to setting up an incoming or outgoing voice communication session. Subsequently (e.g., after a communication session between main module 301 and network 110 is established and can be bridged), the local communication session between communication module 303-1b and DECT end device 101 can be used to exchange media data. In particular, main module 301 may bridge the external communication session between main module 301 and network 110 with the local communication session between communication module 303-1b and DECT end device 101. Communication module 303-1b may then forward media data received from main module 301 to the end device and vice versa.

Communication module 303-1b sends signaling data to and receives signaling data from DECT end device 101 in a format recognized by end device 101. That format could be, e.g., the DECT signaling format. For example, end device 101 may generate and send DECT signaling data to communication module 303-1b in response to input from a user of device 101 (e.g., input corresponding to commencing or ending a telephony session). Communication module 303-1b provides DECT signaling data received from end device 101 to conversion module 303-1a. Conversion module 303-1a then generates appropriate common-format internal signaling information and forwards that signaling information to main module 301 across logical port 302-1. Conversion module 303-1a also receives common-format internal signaling information from main module 301 across logical port 302-1. In response to such received information, conversion module 303-1a generates appropriate DECT signaling data and forwards same to communication module 303-1b for communication to end device 101. End device 101 then takes appropriate action in response (e.g., causing a ringer to ring).

GWSM module 300 also includes a C/P module 2 associated with DECT end device 102. C/P module 2 includes a logical port 302-2 and an EPCH 303-2, with EPCH 303-2 including a signaling conversion module 303-2a and a communication module 303-2b that communicates with device 102 through DECT physical interface 205. C/P module 2 and end device 102 operate in a similar manner as C/P module 1 and end device 101. Main module 301 thus associates logical port 302-1 with end device 101 and logical port 302-2 with end device 102. Main module 301 addresses internal signaling information relating to (and media data intended for) device 101 to logical port 302-1 and addresses signaling information relating to (and media data intended for) device 102 to logical port 302-2. Similarly, main module 301 recognizes internal signaling information received across port 302-1 as relating to device 101, recognizes media data received across port 302-1 as coming from device 101, recognizes internal signaling information received across port 302-2 as relating to device 102, and recognizes media data received across port 302-2 as coming from device 102. If additional communication ports associated with additional DECT end devices were to be installed, main module 301 could similarly exchange media with those end devices across their associated logical ports and exchange internal signaling information relating to those end devices across those same ports.

C/P module 3 is associated with a SIP client 229 executing on WiFi end device 103, which end device communicates with gateway 105 through WiFi physical interface 207. C/P module 3 could be created, e.g., when device 103 enters the transmitting/receiving range of WiFi physical interface 207 and/or in response to a request from device 103. Main module 301 associates logical port 302-3 of communication port 3 with client 229. Thus, main module 301 addresses internal signaling information relating to (and media data intended for) client 229 to logical port 302-3. Similarly, main module 301 recognizes internal signaling information received across port 302-3 as relating to client 229 and recognizes media data received across port 302-3 as coming from client 229.

EPCH 303-3 of communication port 3 includes a signaling conversion module 303-3a and a WiFi communication module 303-3b. EPCH 303-3 further includes a SIP module 303-3c that acts as a SIP proxy server for SIP client 229. In the case of EPCH 303-3, SIP module 303-3c establishes, maintains and discontinues communication sessions with SIP client 229 by exchanging SIP signaling messages with client 229 through WiFi communication module 303-3b. In particular, SIP module 303-3c sends SIP messages for client 229 to WiFi module 303-3b. Module 303-3b then processes the data of those SIP messages for communication using WiFi protocols and causes that data to be communicated across WiFi physical interface 207. Similarly, SIP messages from client 229 are received across physical interface 207 by WiFi communication module 303-3b and provided to SIP module 303-3c.

In response to SIP communications from client 229, SIP module 303-3c causes signaling conversion module 303-3a to generate common-format internal signaling information and to forward that signaling information to main module 301 across logical port 302-3. Similarly, and in response to internal signaling information received by conversion module 303-3a from main module 301, SIP module 303-3c generates SIP messages and forwards those messages to SIP client 229 through WiFi communication module 303-3b. SIP module 303-3c similarly forwards media data received from main module 301 to client 229 and vice versa.

In the example of FIG. 3, GWSM module 300 is shown to include a single SIP C/P module. However, additional SIP C/P modules could be installed for each additional SIP client that registers with main module 300. For each additional SIP client that is registered, main module 301 could associate the logical port of an installed SIP C/P module with that SIP client. Main module 301 could then exchange media data with that client across that logical port and exchange internal signaling data relating to that client across the same logical port. If an additional SIP client is executing on another device communicating with gateway 105 through WiFi physical interface 207, the C/P module associated with that additional SIP client could be similar to C/P module 3. If an additional SIP client is executing on a device communicating with gateway 105 through another physical interface (e.g., Ethernet physical interface 209), the C/P module associated with that additional SIP client could include a communication module different than WiFi communication module 303-3b of C/P module 3. Although each of multiple SIP clients may often execute on its own WiFi (or other) end device, this need not be the case. In other words, a single WiFi (or other) device could simultaneously execute multiple registered SIP clients, with each client having its own corresponding C/P module installed in GWSM module 300.

GWSM module 300 further includes a C/P module 4 associated with an analog telephony interface 210 having and RJ11 jack 325. Main module 300 associates logical port 302-4 of C/P module 4 with all analog telephone end devices that are connected to jack 325. Thus, main module 301 addresses internal signaling information relating to (and media data intended for) such end devices to logical port 302-4, recognizes internal signaling information from port 302-4 as relating to those end devices, and recognizes media data from port 302-4 as coming from those end devices. In the present example, only end device 104 is connected to jack 325. C/P module 4 could be created, e.g., when gateway 105 is initially configured. Because the number of RJ11 jacks or other physical connections for analog telephones to gateway 105 may be relatively static, there may be no need for module 300 to accommodate dynamic registration of additional analog telephones and attendant dynamic installation of associated analog telephone C/P modules.

EPCH 303-4 of C/P module 4 includes a communication module 303-4b that communicates with analog telephony physical interface 210. EPCH 303-4 also includes a signaling conversion module 303-4a that performs various signaling conversion operations in connection with analog telephones connected to interface 210. Although many of those operations are analogous to operations performed by signaling conversion modules 303-1a, 303-2a and 303-3a, the operations performed by a signaling conversion module 303-4a may be significantly simpler. Signaling between C/P module 4 and an analog telephone may be limited to ring signals to a telephone and on-hook/off-hook signals from an analog telephone. In response to internal signaling information from main module 301 relating to one or more telephones connected to RJ11 jack 325, for example, signaling conversion module 303-4a may cause interface 210 to generate a ring voltage on jack 325. In response to an on-hook or off-hook signal from an analog telephone, signaling conversion module 303-4a may generate and send internal signaling information to main module 301.

Analog telephone communication module 303-4b forwards media data received from main module 301 to analog telephones and vice versa. Communication module 303-4b may also include one or more CODECs that communicate with digital-to-analog converter (DAC) circuits and analog-to-digital converter (ADC) circuits in interface 210, which DAC and ADC circuits may convert between digital media data and analog signals recognized by an analog telephone.

Main module 300 could include additional C/P modules in other embodiments. Those C/P modules could be essentially identical to one of communication port modules 104. For example, another C/P module similar to C/P modules 1 and 2 could be installed to accommodate an additional DECT end device. As another example, a C/P module similar to C/P module 3 could be installed to accommodate an additional SIP client communicating with gateway 105 through WiFi physical interface 207. Different types of C/P modules could also be installed. As indicated above, a C/P module associated with a SIP client communicating through Ethernet interface 209 could be installed. As another alternative, a C/P module could be installed and configured for association (and communication) with a client executing on a device that communicates with gateway 105 through another physical interface (e.g., USB interface 204, a BLUETOOTH interface (not shown in FIG. 2), MoCA interface 206, etc.).

FIGS. 4-7 are communication diagrams showing examples of information flows according to some embodiments. The information flows shown in FIGS. 4-7 are not limiting. Other embodiments may include numerous alternate information flows utilizing numerous types of messages. Other communication protocols could be employed.

Figure 4:
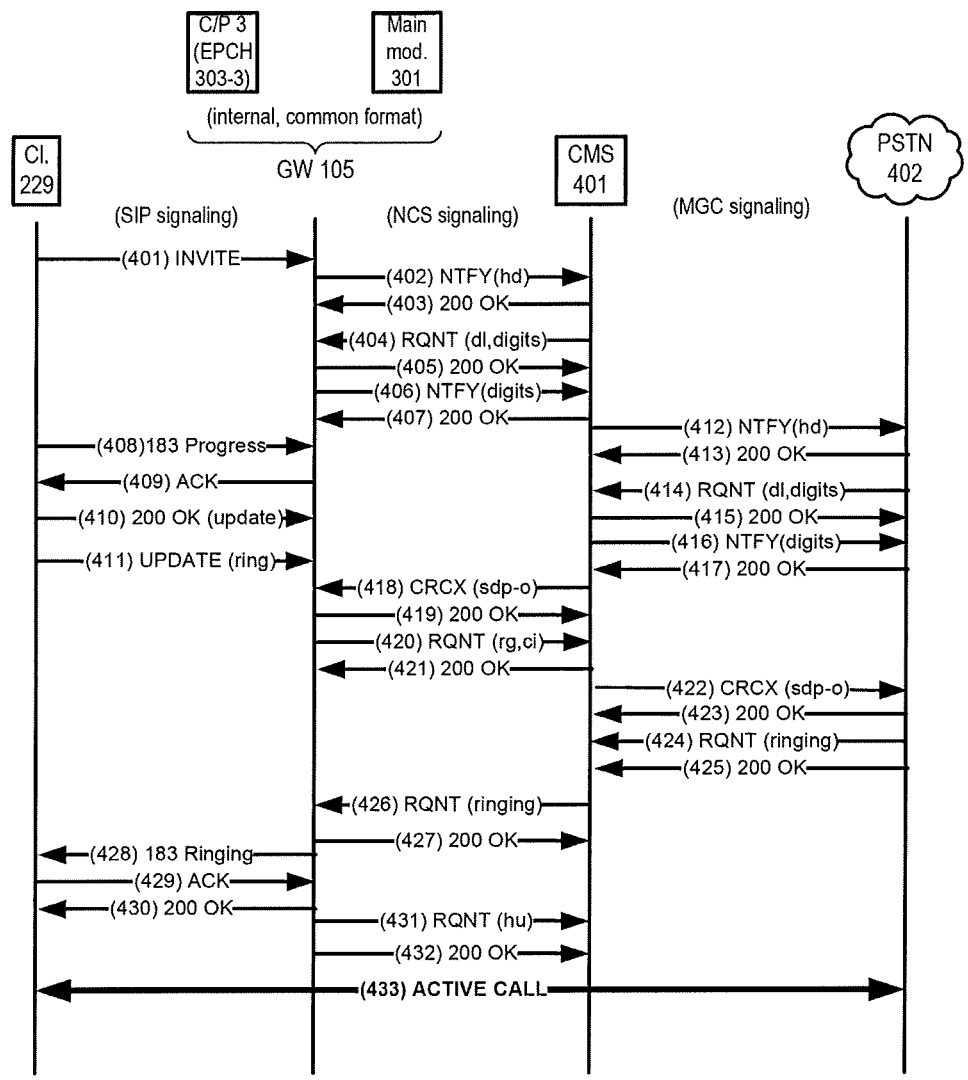
FIGS. 4-7 are communication diagrams showing examples of information flows according to at least some embodiments.

FIG. 4 is a communication diagram showing examples of information flows in connection with a SIP-based communication client executing on an end device communicating with a gateway, such as 105. Other elements of FIGS. 1-3 may also be referred to as examples. In the example of FIG. 4, communications between main module 301 (of gateway 105) and call management server (CMS) 499 are conventional NCS signaling messages used for conventional purposes. Similarly, communications between CMS 499 and one or more elements in PSTN 498 are conventional media gateway control (MGC) signaling messages used for conventional purposes. Because such NCS and MGC messages are known in the art, they will not be discussed in significant detail.

Messages exchanged between client 229 and C/P module 3 may utilize existing SIP signaling message format(s). However, those messages can contain data and/or otherwise be used in a manner not known in the art. As discussed in more detail below, for example, such messages can be used to establish communication sessions between client 229 and C/P module 3, and thus between end device 103 and gateway 105, in one or more novel ways. Such communication sessions allow client 229 to communicate with PSTN 498 (and/or with other elements in network 110) using TNs assigned to gateway 105/premises 106 and/or to utilize services provided to gateway 105/premises 106 by network 110.

Prior to the communications shown in FIG. 4, client 229 may register with GWSM module 300. In connection with client 229 registration, C/P module 3 may be created (or a previously-created communication port configured to operate as communication port 3), and main module 301 associates logical port 302-3 with client 229. As part of client 229 registration, GWSM module 300 may provide client 229 with information about services available through gateway 105. For example, gateway 105 may be provisioned by the operator of network 110 to create voice communication sessions using one of multiple assigned telephone numbers (TNs) associated with premises 106 and/or gateway 105 by network 110. As part of registration, client 229 could thus be provided with those TNs. As another example, gateway 105 may be provisioned to provide notifications, user profiles and other services such as are described in U.S. patent application Ser. No. 12/706,365 (filed Feb. 16, 2010, and titled "Disposition of Video Alerts and Integration of a Mobile Device Into a Local Service Domain"), which application is incorporated by reference herein. As part of registration, client 229 may be provided with information about those services and/or registered to receive notifications and other events related to those services.

Subsequently, and as shown by line 401, client 229 initiates a communication session with EPCH 303-3 of communication port 3. In response to a user input (not shown), client 229 sends a SIP INVITE message 401 and/or one or more additional SIP messages indicating that client 229 wishes to initiate an outgoing voice communication session through gateway 105 using one of the TNs associated with gateway 105. The INVITE message (or other message exchanged in connection with message 401) may include the number being called by the client 229 user, a gateway 105 TN selected by the user for use in the call, and additional information. In response, SIP module 303-3c of EPCH 303-3, acting as a SIP proxy server, initiates a communication session with client 229. SIP module 303-3c, through signaling conversion module 303-3a, exchanges internal signaling information with main module 301 across logical port 302-3. That signaling information communicates that client 229 wishes to be bridged with a yet-to-be-created external voice communication session using the selected TN. Main module 301 then exchanges NCS messages 402 through 407 with CMS 499 to begin set up of the external voice communication session.

As the set up of the external voice communication session proceeds, main module 301 communicates internal signaling information across logical port 302-3 to indicate that set up is in progress. As a result, EPCH 303-3 exchanges various SIP status messages 408-411 with client 229. Set up of the external communication session continues as MGC messages 412-417 are exchanged between CMS 499 and PSTN 498, NCS messages 418-421 are exchanged between main module 301 and CMS 499, additional MGC messages 422-425 are exchanged between CMS 499 and PSTN 498, and further NCS messages 426 and 427 are exchanged between CMS 499 and main module 301. Main module 301 further communicates internal signaling information across logical port 302-3 to indicate that external communication session set up is in progress, resulting in EPCH 303-3 and client 229 exchanging messages 428-430. After main module 301 sends additional NCS messages 431 and 432 to CMS 499, an active voice communication session 433 is established as main module 301 bridges the local communication session between client 229 and C/P module 3 with the external communication session between main module 301 and non-local element(s) in PSTN 498.

Figure 5:
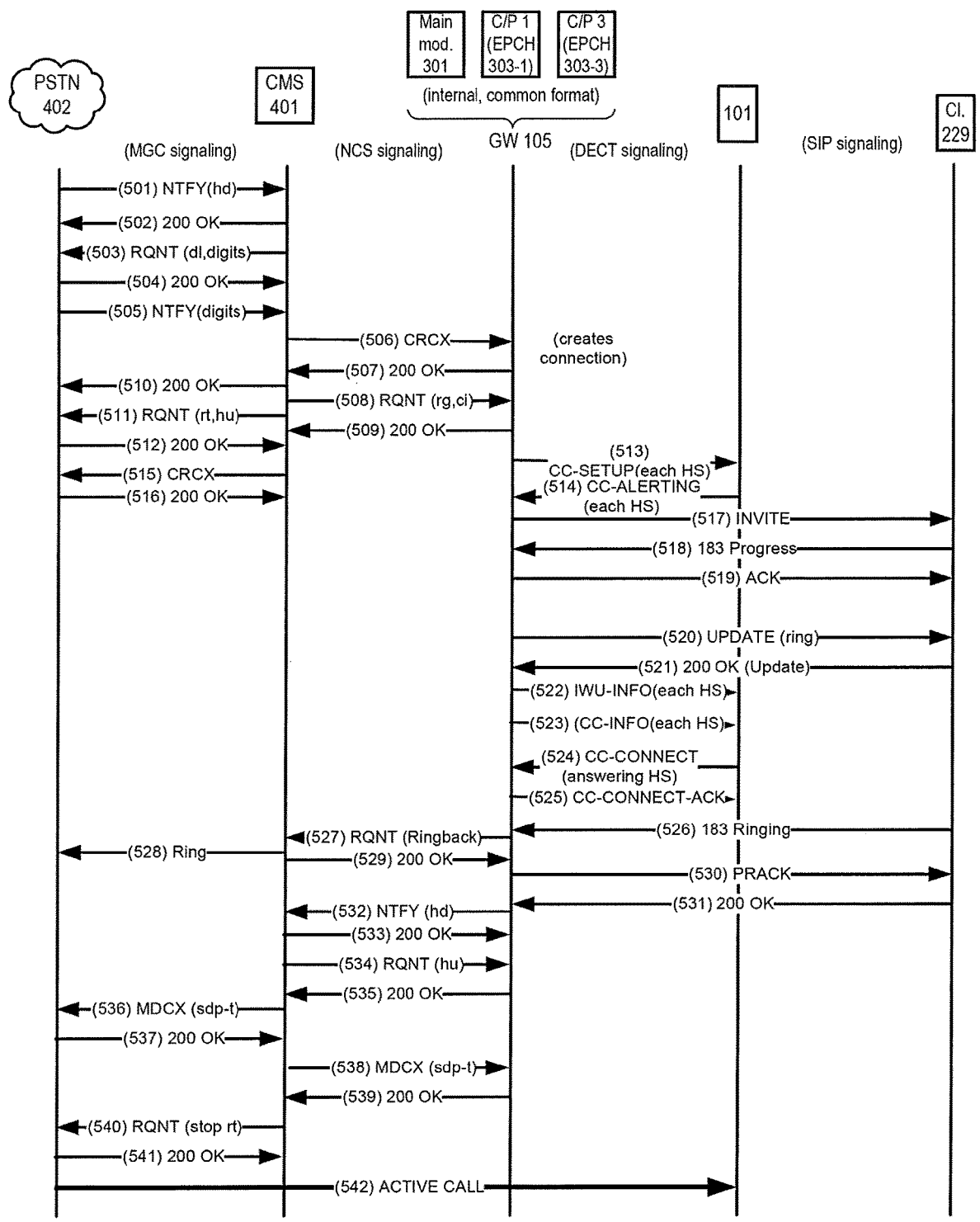

FIG. 5 is a communication diagram showing examples of information flows in connection with external signaling for an incoming communication session. For example, the communication session may be received at gateway 105, and in which client 229 is one of the end points notified of the incoming communication session. As in the example of FIG. 4, communications between main module 301 and call management server (CMS) 499 are conventional NCS signaling messages used for conventional purposes, with communications between CMS 499 and one or more non-local elements in PSTN 498 being conventional media gateway control (MGC) signaling messages used for conventional purposes. Communications between EPCH 303-1 and DECT handset 101 are conventional DECT signaling messages. Because NCS, MGC and DECT messages are known in the art, they will not be discussed in significant detail. Messages exchanged between client 229 and EPCH 303-3 of gateway 105 may utilize existing SIP signaling message format(s), but contain data and/or are otherwise used in a manner not known in the art. For example, such messages can be used to establish communication sessions between client 229 and EPCH 303-3 in a one or more novel ways and that allow client 229 to communicate with non-local elements in PSTN 498 (and/or with other non-local elements in network 110) using TNs assigned to gateway 105/premises 106 and/or to utilize services provided to gateway 105/premises 106 by network 110.

An incoming communication session directed to one of the gateway 105 TNs ("called TN") is initiated by an element in PSTN 498. As a result, MGC messages 501-505 are exchanged between PSTN 498 and CMS 499, NCS messages 506-509 are exchanged between main module 301 and CMS 499, and MGC messages 510-516 exchanged between CMS 499 and PSTN 498 in order to establish a connection between main module 301 and PSTN 498. In response to establishment of this connection, main module 301 checks the status of all end points by checking the status of the logical port corresponding to each device or client. If profiles (as described in application Ser. No. 12/706,365) are in use, main module 301 will route the incoming call to each of the end points associated with the called TN. In particular, main module 301 will exchange, with logical ports associated with each of the end points associated with the called TN, internal signaling information indicating the incoming call and offering the end point the opportunity to create a local voice communication session that can be bridged to an external voice communication session of the incoming call. Alternatively, main module 301 may simply route the incoming call to each end point.

After the connection with PSTN 498 is established, main module 301 sends internal signaling information to port logical 302-1 (associated with end device 101) and to logical port 302-3 (associated with client 229). For simplicity, the example of FIG. 5 only includes DECT handset end device 101 and client 229 operating on end device 103. Other end points could be notified and/or a call session established to include other end points in a manner similar to that described below.

In response to the internal signaling information from GWSM 301, EPCH 303-1 and EPCH 303-3 respectively communicate with end device 101 and with client 229 to alert them of the incoming external communication session and provide each with the option to create a local voice communication session to be bridged with the incoming call. In particular, EPCH 303-1 exchanges DECT signaling messages 513, 514, 522 and 523 with end device 101 that relate to the incoming communication session. EPCH 303-3 exchanges SIP messages 517-521 with client 229 that relate to the incoming call. Notably, messages 513, 514, 522 and 523 relate to the incoming communication session between PSTN 498 and main module 301 and to the voice communication session that may potentially be established between PSTN 498 and main module 301. Messages 513, 514, 522 and 523 are part of a communication session between EPCH 303-1 and device 101 that may become a local voice communication session that will be bridged into the external voice communication session to be established between PSTN 498 and main module 301. SIP messages 517-521 exchanged with client 229 similarly relate to the incoming communication session between PSTN 498 and main module 301 and to the voice communication session to be established between PSTN 498 and main module 301.

In the current example, the notification of the incoming communication session is answered by end device 101, resulting in exchange of DECT messages 524 and 525 between device 101 and EPCH 303-1. EPCH 303-1 sends internal signaling information to main module 301 advising that end device 101 has picked up. Main module 301 then sends internal signaling information to logical port 302-3 instructing client 229 to stop ringing, which in turn causes EPCH 303-3 and client 229 to exchange SIP messages 526, 530 and 531. Main module 301 also completes establishing of the external voice communication session by exchanging messages 527, 529, 532-535, 538 and 539 with CMS 499, and with CMS 499 exchanging messages 528, 536, 537, 540 and 541 with PSTN 498. Ultimately, active voice call session 542 is established when main module 301 bridges the PSTN 498/main module 301 external voice communication session with the EPCH 303-1/device 101 internal voice communication session.

If client 229 had picked up the incoming communication, appropriate SIP signaling messages would have been exchanged between client 229 and EPCH 303-3, with EPCH 303-3 then sending internal signaling information to main module 301 indicating client 229 had picked up. Main module 301 would then have sent internal signaling information to logical port 302-1 causing EPCH 303-1 to exchange DECT messages with end device 101 to cause device 101 to stop ringing.

In some embodiments, main module 301 may track all ongoing communication sessions and the TNs used by each session. If the called TN was in use by an end point at the time of the incoming external communication request, this would have been noted by main module 301. Main module 301 could then have sent internal signaling information to logical ports that cause EPCHs to send call waiting signaling messages to the end points engaged in the pre-existing communication session. Call waiting signaling messages could also be sent to end points engaged in a communication session using a TN other than a called TN. For example, client 229 might be engaged in a communication session using another TN when an incoming communication session request is received. In response to internal signaling information from main module 301 indicating the incoming request, EPCH 303-3 could then send SIP messages to client 229 that would advise client 229 of the incoming request. Depending on client configuration and user preferences, client 229 could then put the initial communication session on hold and accept the incoming request, disconnect the initial communication session and accept the incoming request, or ignore the incoming request. Client 229 could also display a call waiting indicator to advise a user of the incoming request. Client 229 could also include a "do not disturb" setting that prevents a call-waiting indicator from being displayed.

Figure 6:
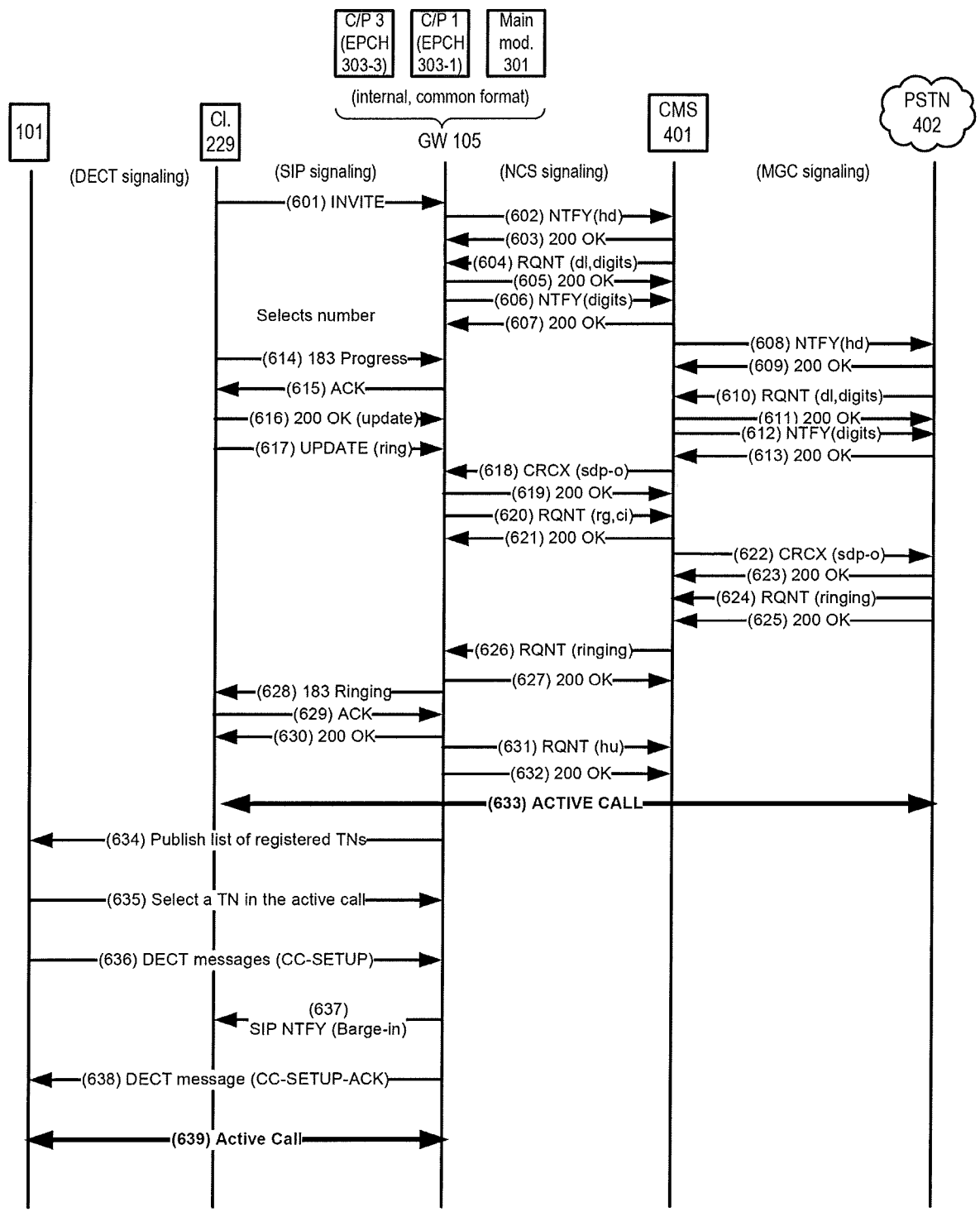

FIG. 6 is a communication diagram showing example information flows in connection with "barge-in." In particular, FIG. 6 shows communications in connection with end device 101 being bridged into an ongoing communication session. As with FIGS. 4 and 5, conventional NCS signaling messages between main module 301 and CMS 499 and MGC signaling messages between CMS 499 and PSTN 498 are not described in detail.

In the example of FIG. 6, messages 601 through 632 are respectively similar to messages 401 through 432 of FIG. 4, resulting in a voice communication session 633 that is similar to voice communication session 433.

Subsequently, EPCH 303-1 sends DECT signaling message 634 that contains data regarding the status of each TN assigned to gateway 105. Although not shown in FIG. 6, a user of end device 101 may have previously provided an input that activated device 101 and caused device 101 to send a DECT signaling message to EPCH 303-1 indicating that a user of device 101 wished to either join an ongoing communication session or to initiate a new communication session. In response to such a message EPCH 303-1 may have sent corresponding internal signaling information to main module 301, with main module 301 then sending internal signaling information to logical port 302-1 that caused EPCH 303-1 to send message 634.

In response to message 634, device 101 displays information about the status of each TN. The user of device 101 then selects the TN being used for communication session 633. In response, device 101 sends DECT signaling messages 635 and 636 selecting the in-use TN and asking to join that communication session. In response to messages 635 and 636, EPCH 303-1 sends internal signaling information to main module 301 indicating the request from end device 101 to join communication session 633. Main module 301 sends internal signaling information to logical port 302-3 indicating the request from device 101 to join the communication session. In response, EPCH 303-3 sends SIP message 637 to client 229. Subsequently, EPCH 303-1 sends DECT message 638 to device 101 and establishes communication session 639 with device 101. Main module 301 then bridges session 639 with session 633. As part of the bridging, main module 301 mixes the audio data from device 101 and client 229. Main module 301 may also transcode the audio data from one or both of device 101 and client 229.

If a user of client 229 wished to join an ongoing communication session involving device 101, client 229 could similarly display a list of TNs associated with gateway 105 and the status of each TN. In response to a user selection of an in-use TN, client 229 could then send a SIP INVITE message to EPCH 303-3 containing the in-use TN and an indication of a request to join the on-going call. EPCH 303-3 could then send internal signaling information to main module 301, which would then send internal signaling information to logical port 302-1, with EPCH 303-1 then sending a DECT signaling message to device 101 indicating the barge-in request. Subsequently, a session between client 229 (initiated by the INVITE with the in-use TN) would be bridged to the ongoing communication session.

Figure 7:
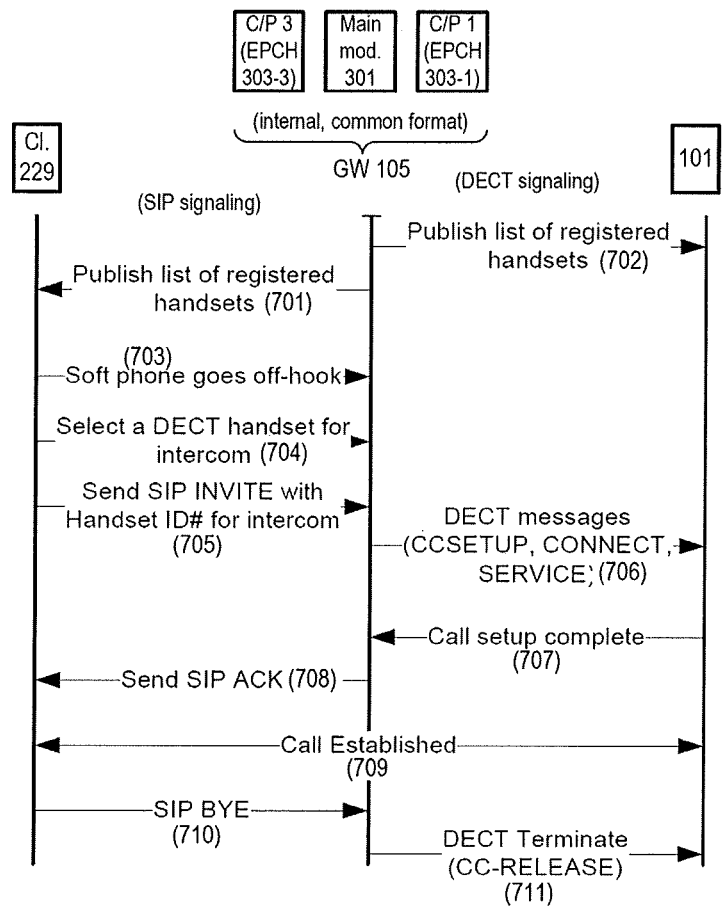

FIG. 7 is a communication diagram showing information flows that can be used, for example, in connection with use of DECT device 101 and SIP client 229 as an intercom system. In some embodiments, a user of one end point can establish a voice communication session with another end point. EPCH 303-1 sends DECT message 702 to device 101 that contains information about other devices and clients registered for communication with gateway 105. EPCH 303-3 sends a SIP message 701 to client 229 with similar information. Each of messages 701 and 702 can be sent in response to previous requests (not shown) from client 229 or device 101, or could be sent automatically (e.g., as part of device or client registration). Subsequently, a user of client 229 provides input indicating that client 229 wishes to establish a voice communication session with device 101. In response client 229 sends one or more SIP messages 703-705 to EPCH 303-3. EPCH 303-3 then sends internal signaling information to main module 301 indicating the voice session request, in response to which main module 301 sends internal signaling information to logical port 302-1, in response to which EPCH 303-1 exchanges DECT messages 706 and 707 with device 101. After message 707, a voice communication session between EPCH 303-1 and device 101 is established. EPCH 303-1 communicates the establishment of that session to main module 301, which then sends signaling information to logical port 302-3, which in turn causes EPCH 303-3 to send SIP message 708 to client 229. After SIP message 708, main module 301 bridges a SIP session between EPCH 303-3 and client 229 to the voice session between EPCH 303-1 and device 101 and creates (bridged) voice session 709. In response to user input terminating the session, client 229 later sends SIP message 710, which ultimately results in DECT message 711 sent to device 101.

Client 229 could be provided to end device 103 in a variety of manners. In some embodiments, for example, end device 103 and other similar end devices are owned by subscribers to a wide area wireless network. The operator of that wireless network may operate an online "application store" or similar service by which individual users can download software for different applications to their end devices. Client 229 could be one such application. As another example, client 229 could be stored on a local gateway such as gateway 105. An end device entering the service domain of the local gateway could then download and install client 229.

As indicated above, client 229 may initially register with EPCH 303-3 prior to establishing communication sessions. This registration could be initiated in various manners. If client 229 is downloaded to an end device from gateway 105 after the end device enters the gateway 105 service domain, an installation routine could be configured to automatically begin a registration process once client installation is completed. C/P module 3 may have been previously installed and configured for association with a device that might later download client 229 from gateway 105. Alternately, a separate module of GWSM module 300 could be included to detect a new device downloading client 229, and in response to then create/install C/P module 3 (or a C/P module similar to C/P module 3).

If client 229 is installed on an end device prior to that end device entering the gateway 105 service domain, registration might begin when a user activates client 229 and/or when client 229 detects an SSID or other identifier emanating from gateway 105. One or more C/P modules similar to C/P module 3 could be pre-installed in GWSM module 300 and available for association with newly present clients like 229. Alternatively, GWSM module 300 could be configured to create a new C/P module (similar to C/P module 3) upon detecting the presence of a new client similar to client 229.

As part of registration, authentication of device 103 and/or of a user associated with device 103 can be required. Such authorization can include use of a username and password previously obtained, e.g., from the operator of network 110 and/or from an entity administering local gateway 105. Authentication could alternatively or additionally include, e.g., use of a mobile telephone number associated with an end device, personal credentials (e.g., a digital certificate), etc.

In some embodiments, no additional billing procedures may be needed for communication sessions involving devices (such as device 103) that might be temporarily associated with a particular local network gateway. In other embodiments (e.g., where a local network gateway is operated by a commercial establishment), it may be desirable to provide separate billing for sessions involving such temporarily associated devices. As one example, an operator of network 110 or of local network gateway 105 might require that a user of device 103 agree to pay for calls made through local network gateway 105 and to provide a credit card number or make other arrangements to facilitate such billing. When the user of device 103 establishes a communication session through gateway 105, a separate call data record can be generated (either within network 110 or within GWSM 301) and transmitted to a billing server.

Other embodiments include numerous variations on the devices, systems and operations described above. For example, client 229 could be configured to generate user interfaces and provide notifications similar to those described in the aforementioned U.S. patent application Ser. No. 12/706,365. As another example, client 229 could be configured to support multiple simultaneous communication sessions. Different signaling protocols can be employed. In some embodiments, for example, main module 301 is configured to communicate with a call state control function (CSF) using SIP signaling instead of with a call management server using NCS signaling.

In at least some embodiments, other end devices associated with local gateway 105 can be bridged into voice communication sessions established by end device 103 over a 3G or other type of wide area wireless network used by device 103.

As can be appreciated from the above description, the devices, systems and methods described herein offer various advantages. For example, end device 103 might be owned by a user who is only temporarily present in premises 106 served by gateway 105. If gateway 105 has been provisioned by the operator of network 110 to have certain associated TNs and/or other services, device 103 can utilize such TNs and/or other services. This can allow device 103 to, e.g., utilize a TN that has an E911 association with premises 106, utilize network 110 for communication links instead of a 3G or other wide area wireless network that device 103 might otherwise use, establish voice communication sessions that enjoy any enhanced QoS (quality of service) that network 110 might offer for voice communication sessions, etc.

Figure 8:
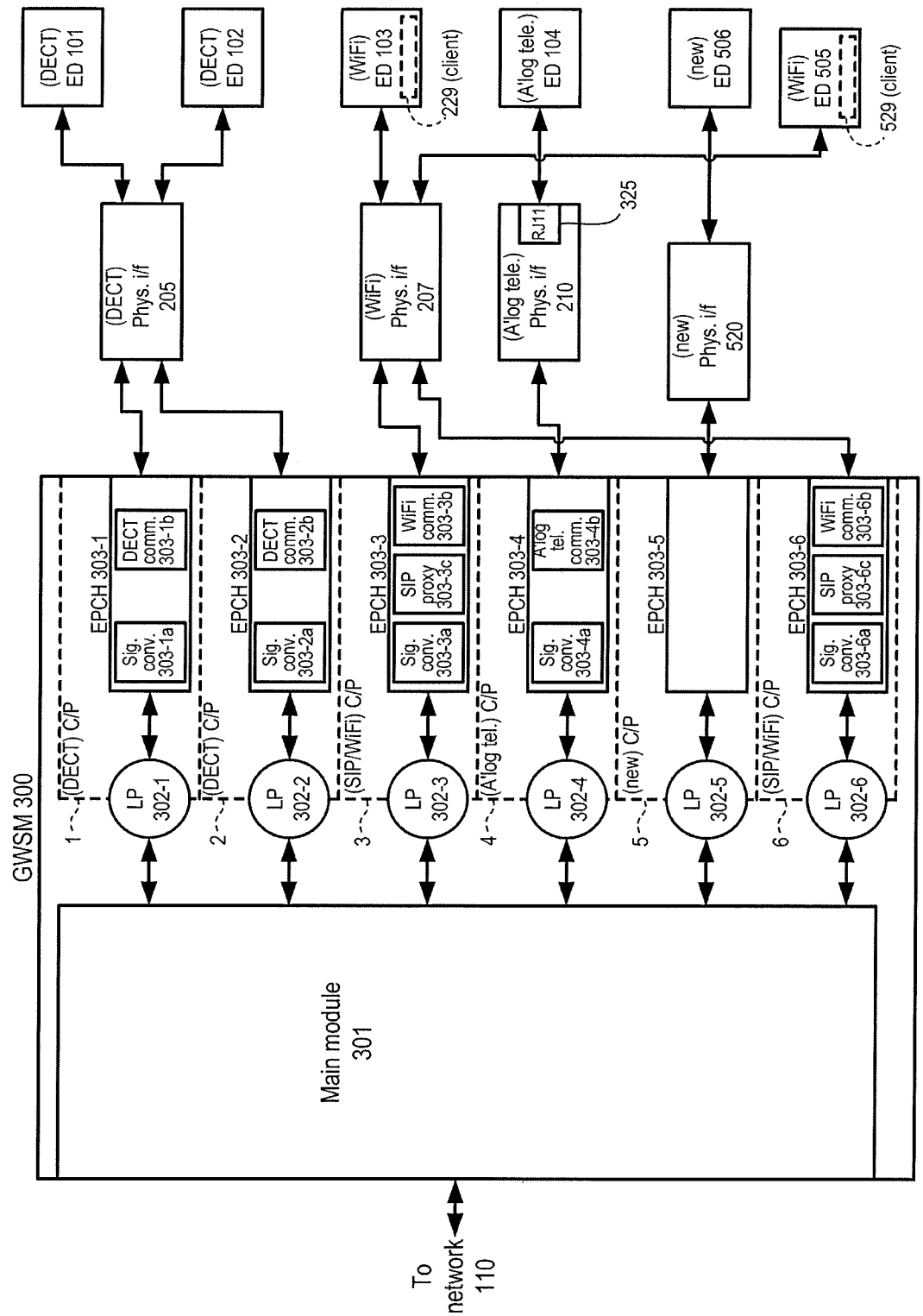
FIG. 8 is another block diagram showing various modules executing or executable within a local network gateway according to at least some embodiments.

Another advantage offered by various embodiments is the ability to more easily add additional end devices and/or types of end devices. Using architectures such as are described herein, a new type of physical interface can be added to gateway 105, and that new physical interface used for communication sessions with end devices (or with clients executing on end devices) communicating through that new interface. FIG. 8 is similar to FIG. 3, but shows an additional C/P module 5 associated with a new end device 506. Device 506 communicates over a new type of physical interface 520. C/P module 5 includes a logical port 302-5 that main module 301 associated with end device 506 and/or with a communication client executing on client 506. An EPCH 303-5 corresponds to interface 520 and performs operations in connection with main module 301 and device 506 that are similar to those described above for other EPCHs. In particular, EPCH 303-5 includes a signaling conversion module (not shown) that provides a layer of abstraction between the signaling protocol used by device 506 and the external signaling protocol used by main module 301. This facilitates adding of a new type of physical interface without having to extensively revise instructions associated with GWSM module 300.

As also shown in FIG. 8, an additional end device 505 is now communicating through WiFi physical interface 207. A second SIP-based client 529 executes on device 505. Main module 301 associates logical port 302-6 of C/P module 6 with client 529. Client 529 is similar to, and operates in a manner similar to that of, client 229. C/P module 6 also includes an EPCH 303-6 that is similar to EPCH 303-3 and that includes a signaling conversion module 303-6a, a WiFi communication module 303-6b and a SIP module 303-6c.

Embodiments also include one or more tangible machine-readable storage media (e.g., a CD-ROM, CD-RW, DVD, floppy disc, FLASH memory, RAM, ROM, magnetic platters of a hard drive, etc.) that store instructions executable by one or more processors to carry out one or more of the operations described herein. As used herein (including the claims), a tangible machine-readable storage medium is a physical structure that can be touched by a human. A signal would not by itself constitute a tangible machine-readable storage medium, although other embodiments may include signals or other ephemeral versions of instructions executable by one or more processors to carry out one or more of the operations described herein.

The foregoing description of embodiments has been presented for purposes of illustration and description. The foregoing description is not intended to be exhaustive or to limit embodiments to the precise form disclosed, and modifications and variations are possible in light of the above teachings or may be acquired from practice of various embodiments. The embodiments discussed herein were chosen and described in order to explain the principles and the nature of various embodiments and their practical application to enable one skilled in the art to utilize the present invention in various embodiments and with various modifications as are suited to the particular use contemplated. All embodiments need not necessarily achieve all objects or advantages identified above. Any and all permutations of various features described herein are within the scope of the invention.

The invention claimed is:

1. A method comprising:
receiving, by a computing device, a communication request associated with a communication session for a destination telephone number;
determining, based on information that indicates an association between a first telephone number and a first user device that is configured to communicate via Session Initiation Protocol (SIP) and indicates an association between a second telephone number and a second user device that is configured to communicate via a protocol different from SIP, whether to send a message associated with the communication session to the first user device or to the second user device; and
sending the message associated with the communication session to the first user device using SIP or to the second user device using the protocol different from SIP.

2. The method of claim 1, further comprising:
generating, based on SIP, a local communication session between the computing device and the first user device; and
associating, based on a signaling conversion between a telecommunication protocol and SIP, the local communication session with the communication session, wherein the sending the message comprises sending the message to the first user device via a wireless communication interface of the computing device.

3. The method of claim 1, further comprising:
receiving a second communication request associated with a second communication session for the destination telephone number; and
sending, based on the second communication request, a call waiting signaling message to the first user device and to a third user device that is configured to communicate with the computing device via Digital Enhanced Cordless Telecommunications (DECT) protocol.

4. The method of claim 3, further comprising:
generating, based on SIP, a local communication session between the computing device and the first user device; and
based on a response received after sending the call waiting signaling message:
putting the local communication session on hold; or
disconnecting the local communication session.

5. The method of claim 1, further comprising:
generating, based on SIP, a first local communication session between the computing device and the first user device;
receiving, from a third user device, a request to join the first local communication session; and
associating, based on Digital Enhanced Cordless Telecommunications (DECT) protocol and the request to join the first local communication session, the first local communication session with a second local communication session that is between the computing device and the third user device.

6. The method of claim 1, further comprising:
generating, based on the protocol different from SIP, a first local communication session between the computing device and the second user device;
receiving, from the first user device, one or more wireless SIP messages comprising a request to join the first local communication session; and
associating, based on SIP and the request to join the first local communication session, the first local communication session with a second local communication session that is between the computing device and the first user device.

7. The method of claim 1, further comprising:
receiving, from a third user device and based on Digital Enhanced Cordless Telecommunications (DECT) protocol, an indication to accept the communication request; and
sending, to the first user device and based on the indication to accept the communication request, an instruction to stop ringing,
wherein the sending the message comprises sending the message to the first user device and to the third user device.

8. An apparatus comprising:
one or more processors; and
memory storing instructions that, when executed by the one or more processors, cause the apparatus to:
receive a communication request associated with a communication session for a destination telephone number;
determine, based on information that indicates an association between a first telephone number and a first user device that is configured to communicate via Session Initiation Protocol (SIP) and indicates an association between a second telephone number and a second user device that is configured to communicate via a protocol different from SIP, whether to send a message associated with the communication session to the first user device or to the second user device; and
send the message associated with the communication session to the first user device using SIP or to the second user device using the protocol different from SIP.

9. The apparatus of claim 8, wherein the instructions, when executed by the one or more processors, cause the apparatus to:
generate, based on SIP, a local communication session between the apparatus and the first user device;
associate, based on a signaling conversion between a telecommunication protocol and SIP, the local communication session with the communication session; and
send the message by sending the message to the first user device via a wireless communication interface of the apparatus.

10. The apparatus of claim 8, wherein the instructions, when executed by the one or more processors, cause the apparatus to:
receive a second communication request associated with a second communication session for the destination telephone number; and
send, based on the second communication request, a call waiting signaling message to the first user device and to a third user device that is configured to communicate with the apparatus via Digital Enhanced Cordless Telecommunications (DECT) protocol.

11. The apparatus of claim 10, wherein the instructions, when executed by the one or more processors, cause the apparatus to:
generate, based on SIP, a local communication session between the apparatus and the first user device; and
based on a response received after sending the call waiting signaling message:
put the local communication session on hold; or
disconnect the local communication session.

12. The apparatus of claim 8, wherein the instructions, when executed by the one or more processors, cause the apparatus to:
generate, based on SIP, a first local communication session between the apparatus and the first user device;
receive, from a third user device, a request to join the first local communication session; and
associate, based on Digital Enhanced Cordless Telecommunications (DECT) protocol and the request to join the first local communication session, the first local communication session with a second local communication session that is between the apparatus and the third user device.

13. The apparatus of claim 8, wherein the instructions, when executed by the one or more processors, cause the apparatus to:
generate, based on the protocol different from SIP, a first local communication session between the apparatus and the second user device;
receive, from the first user device, one or more wireless SIP messages comprising a request to join the first local communication session; and
associate, based on SIP and the request to join the first local communication session, the first local communication session with a second local communication session that is between the apparatus and the first user device.

14. The apparatus of claim 8, wherein the instructions, when executed by the one or more processors, cause the apparatus to:
receive, from a third user device and based on Digital Enhanced Cordless Telecommunications (DECT) protocol, an indication to accept the communication request; and
send, to the first user device and based on the indication to accept the communication request, an instruction to stop ringing; and
send the message by sending the message to the first user device and to the third user device.

15. A non-transitory computer-readable medium storing instructions that, when executed, cause:
receiving a communication request associated with a communication session for a destination telephone number;
determining, based on information that indicates an association between a first telephone number and a first user device that is configured to communicate via Session Initiation Protocol (SIP) and indicates an association between a second telephone number and a second user device that is configured to communicate via a protocol different from SIP, whether to send a message associated with the communication session to the first user device or to the second user device; and
sending the message associated with the communication session to the first user device using SIP or to the second user device using the protocol different from SIP.

16. The non-transitory computer-readable medium of claim 15, wherein the instructions, when executed, cause:
generating, based on SIP, a local communication session associated with the first user device; and
associating, based on a signaling conversion between a telecommunication protocol and SIP, the local communication session with the communication session.

17. The non-transitory computer-readable medium of claim 15, wherein the instructions, when executed, cause:
receiving a second communication request associated with a second communication session for the destination telephone number; and
sending, based on the second communication request, a call waiting signaling message to the first user device and to a third user device that is configured to communicate via Digital Enhanced Cordless Telecommunications (DECT) protocol.

18. The non-transitory computer-readable medium of claim 17, wherein the instructions, when executed, cause:
generating, based on SIP, a local communication session associated with the first user device; and
based on a response received after sending the call waiting signaling message:
putting the local communication session on hold; or
disconnecting the local communication session.

19. The non-transitory computer-readable medium of claim 15, wherein the instructions, when executed, cause:
generating, based on SIP, a first local communication session associated with the first user device;
receiving, from a third user device, a request to join the first local communication session; and
associating, based on Digital Enhanced Cordless Telecommunications (DECT) protocol and the request to join the first local communication session, the first local communication session with a second local communication session that is associated with the third user device.

20. The non-transitory computer-readable medium of claim 15, wherein the instructions, when executed, cause:
generating, based on the protocol different from SIP, a first local communication session associated with the second user device;
receiving, from the first user device, one or more wireless SIP messages comprising a request to join the first local communication session; and
associating, based on SIP and the request to join the first local communication session, the first local communication session with a second local communication session that is associated with the first user device.

21. The non-transitory computer-readable medium of claim 15, wherein the instructions, when executed, cause:
receiving, from a third user device and based on Digital Enhanced Cordless Telecommunications (DECT) protocol, an indication to accept the communication request; and
sending, to the first user device and based on the indication to accept the communication request, an instruction to stop ringing; and
sending the message by sending the message to the first user device and to the third user device.

22. The method of claim 1, wherein the protocol different from SIP comprises at least one of:
a Digital Enhanced Cordless Telecommunications (DECT) protocol;
a wired analog telephone protocol;
a Plain and Old Telephone Service (POTS);
a Cordless Advanced Technology—Internet and Quality (CAT-iq) protocol; or
a Digital Living Network Alliance (DLNA) protocol.

23. The apparatus of claim 8, wherein the protocol different from SIP comprises at least one of:
a Digital Enhanced Cordless Telecommunications (DECT) protocol;
a wired analog telephone protocol;
a Plain and Old Telephone Service (POTS);
a Cordless Advanced Technology—Internet and Quality (CAT-iq) protocol; or
a Digital Living Network Alliance (DLNA) protocol.

24. The non-transitory computer-readable medium of claim 15, wherein the protocol different from SIP comprises at least one of:
a Digital Enhanced Cordless Telecommunications (DECT) protocol;
a wired analog telephone protocol;
a Plain and Old Telephone Service (POTS);
a Cordless Advanced Technology—Internet and Quality (CAT-iq) protocol; or
a Digital Living Network Alliance (DLNA) protocol.

* * * * *